(12) United States Patent
Mehrer et al.

(10) Patent No.: US 7,840,333 B2
(45) Date of Patent: Nov. 23, 2010

(54) EVENT-DRIVEN STARTER CONTROLLER

(75) Inventors: Michael E. Mehrer, San Diego, CA (US); Peter J. Suttie, San Diego, CA (US); Alex Seguritan, San Diego, CA (US); Gilles E. Marion, Genas (FR)

(73) Assignee: Hamilton Sundstrand Corporation, Rockford, IL (US)

( * ) Notice: Subject to any disclaimer, the term of this patent is extended or adjusted under 35 U.S.C. 154(b) by 907 days.

(21) Appl. No.: 11/731,216

(22) Filed: Mar. 30, 2007

(65) Prior Publication Data

US 2009/0069998 A1    Mar. 12, 2009

(51) Int. Cl.
    *F02C 7/22*    (2006.01)
(52) U.S. Cl. .......................................... 701/100; 60/788
(58) Field of Classification Search .................... 701/36, 701/100; 60/776, 777, 778, 788, 786, 790, 60/789
    See application file for complete search history.

(56) References Cited

U.S. PATENT DOCUMENTS

| | | | |
|---|---|---|---|
| 3,686,859 A | 8/1972 | White | |
| 5,428,275 A | 6/1995 | Carr et al. | |
| 6,035,626 A | 3/2000 | Wahl et al. | |
| 6,810,676 B2 * | 11/2004 | O'Connor | 60/778 |
| 7,204,090 B2 * | 4/2007 | O'Connor | 60/778 |
| 7,448,220 B2 * | 11/2008 | Schmidt et al. | 60/788 |

* cited by examiner

*Primary Examiner*—Richard M. Camby
(74) *Attorney, Agent, or Firm*—Kinney & Lange, P.A.; Michael A. Collins

(57) ABSTRACT

An event-driven starter controller regulates the speed of a gas turbine engine based on detected events. The event-driven starter controller is used to supply motive force to the gas turbine engine prior such that the gas turbine engine is able to ignite (i.e., achieve light-off). In particular, in response to engine speed reaching a defined threshold, the event-driven starter controller causes the speed of the starter motor to ramp or increase through a defined range of speeds suitable for engine light-off (i.e, light-off window). Upon reaching an upper threshold of the light-off window, the event-driven starter controller causes the speed of the starter motor to decrease through the range of speeds suitable for engine light-off. If at any time during the light-off window the event-driven starter controller detects a successful light-off condition, the event-driven starter controller causes the speed of the gas turbine engine to increase toward a second threshold.

16 Claims, 4 Drawing Sheets

EVENT-DRIVEN STARTER CONTROLLER

BACKGROUND

The present invention relates generally to gas turbine engines, and more specifically to a starter controller and a method used to control the speed of the gas turbine engines during start-up.

A gas turbine engine typically includes a compressor stage, a combustor stage, and a turbine stage. The compressor stage compresses air provided at a forward end of the gas turbine engine and provides the compressed air to the compressor stage. Nozzles within the compressor stage add fuel to the compressed air. The compressed air/fuel mixture is ignited within the combustor and the resulting exhaust from the combustion generates thrust toward the aft end of the gas turbine engine. The exhaust is provided to the turbine stage, which extracts energy from the exhaust to provide the motive force necessary to power the compressor stage, such that the gas turbine engine is self-sustaining.

To start a gas turbine engine, a starter motor is used to provide motive force to the shaft connecting the compressor stage to the turbine stage. The starter motor is used to increase the speed of the compressor stage to a point at which the compressed air provided to the combustor stage results in a fuel/air mixture that is suitable for ignition (commonly referred to as 'light-off'). Typically, light-off occurs at approximately 10-20% of the operating speed of the gas turbine engine. Following light-off, the starter motor continues to provide torque to the gas turbine engine until the engine reaches approximately 50-60% of the engine's operating speed. At this point, the gas turbine engine is self-sustaining (i.e., the power generated by the gas turbine is sufficient to power the compressor stage) such that the gas turbine engine does not require motive force from the starter motor.

To initiate light-off, it is therefore important to control the speed of the gas turbine engine to provide the proper fuel/air mixture to the combustion chamber.

SUMMARY

In one aspect of the present invention, an event-driven starter controller regulates the speed of a starter motor based on detected events. The event-driven starter controller includes an event detector, a speed selector, a comparator, a controller, and a ramp rate sequencer. The event detector detects events associated with the start-up of the gas turbine engine based on input that include an engine start request, an engine speed measurement, and a light-off detection measurement. The speed selector switch is controlled by the event detector based on detected events to select from one of a number of speed inputs including an engine off speed, a first set-point, a ramping input, and a second set-point. A comparator compares the speed input provided by the speed selector switch to the measured engine speed, and provides the result of the comparison to a controller that generates a torque command based on the comparison between the speed input and the measured engine speed. A ramp rate sequencer provides a ramped input to the speed selector switch. In response to the event detector causing the speed selector switch to select the input corresponding to the ramp rate sequencer, the ramp rate sequencer generates a speed input that increases at a defined rate until the event detector detects a light-off condition or an upper threshold is reached. If the upper threshold is reached then the ramp rate sequencer causes the speed input to decrease at a defined rate until the event detector detects a light-off condition or a lower threshold is reached.

Another aspect of the present invention provides for a method of controlling the speed of a gas turbine engine during start-up to achieve successful light-off of the gas turbine engine. The method includes controlling the speed of the gas turbine engine to increase toward a first speed set-point in response to a detected engine start request. In response to the engine speed reaching a first threshold value, the method includes controlling the speed of the gas turbine engine to increase at a defined rate in response to the engine speed reaching a first threshold value. In response to the engine speed being increased at the defined rate to an upper threshold value without achieving light-off, the method includes controlling the speed of the gas turbine engine to decrease at a defined rate. If during the process of increasing the engine speed at a defined rate or decreasing the engine speed at a defined rate, a successful light-off is detected, then the method includes controlling the speed of the gas turbine engine to increase towards a second set-point.

DETAILED DESCRIPTION

An event-driven starter controller provides a method of controlling the speed of a gas turbine engine to ensure light-off of the gas turbine engine. Light-off refers to the point at which the fuel/air mixture provided to the combustor chamber is suitable for and in fact results in ignition of the gas turbine engine. In particular, the event-driven starter controller controls the speed of the gas turbine engine based on a series of detected events, which can begin with a start request (event A). Following a start request, the event-driven starter controller monitors engine speed to detect when the engine speed reaches a defined threshold (event B). In response to detection of event B, the even-driven starter controller causes the engine speed to ramp at a defined rate through a range of speeds suitable for light-off (i.e., light-off window). If light-off is detected during this time (event C), then the event-driven controller rapidly increases engine speed toward an operational speed until a second defined threshold value is reached (event D), at which point the gas turbine engine is self-sustaining and the starter motor is disengaged. If the engine speed is ramped through the defined light-off window without achieving light-off (event E), then the event-driven controller causes the engine speed to decrease in a ramped manner through the light-off window to allow the gas turbine engine another chance to achieve light-off. If the speed of the gas-turbine engine decreases through the light-off window without achieving light-off (event F), then the engine start operation is aborted.

Figure 1:
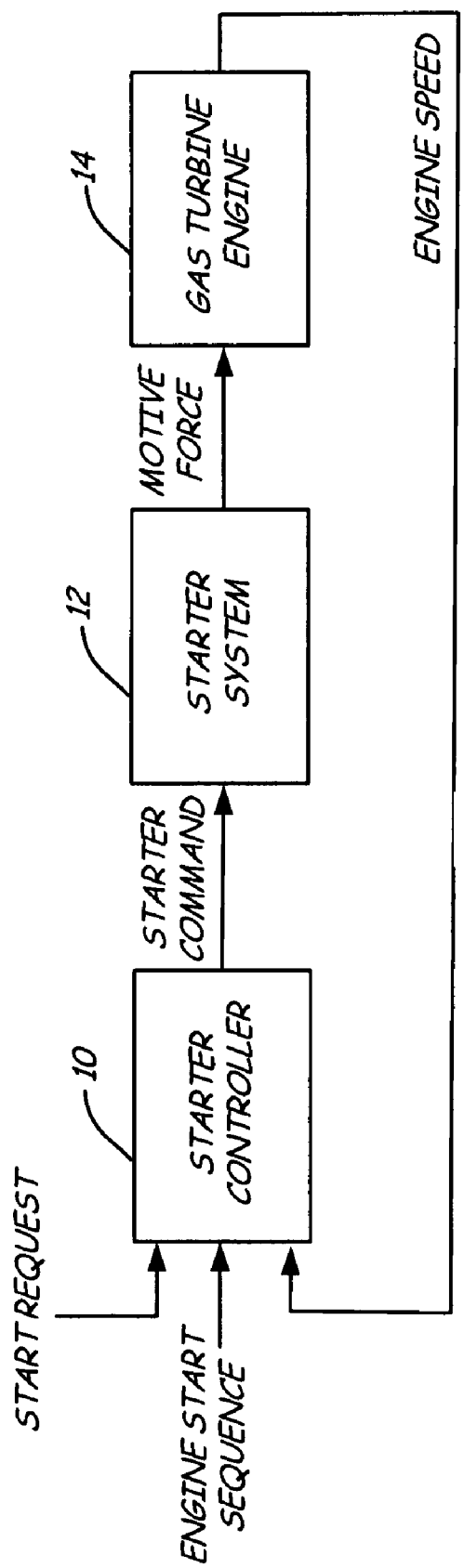
FIG. 1 is a block diagram of a starter controller, starter system and gas turbine engine.

FIG. 1 is a block diagram illustrating the connection between starter controller 10, starter system 12, and gas turbine engine 14. Starter controller 10 receives inputs that include a start request, an engine start sequence, and engine speed measured within gas turbine engine 14. Based on these inputs, event-driven starter controller detects events associated with the sequence of starting gas turbine engine 14. In response to detected events, event-driven starter controller determines a desired speed of gas turbine engine 14 and generates a starter command (e.g., a torque command) that is provided to starter system 12. Based on the received starter command, starter system 12 generates motive force that causes gas turbine engine to rotate at a speed determined by starter controller 10.

Figure 2A:
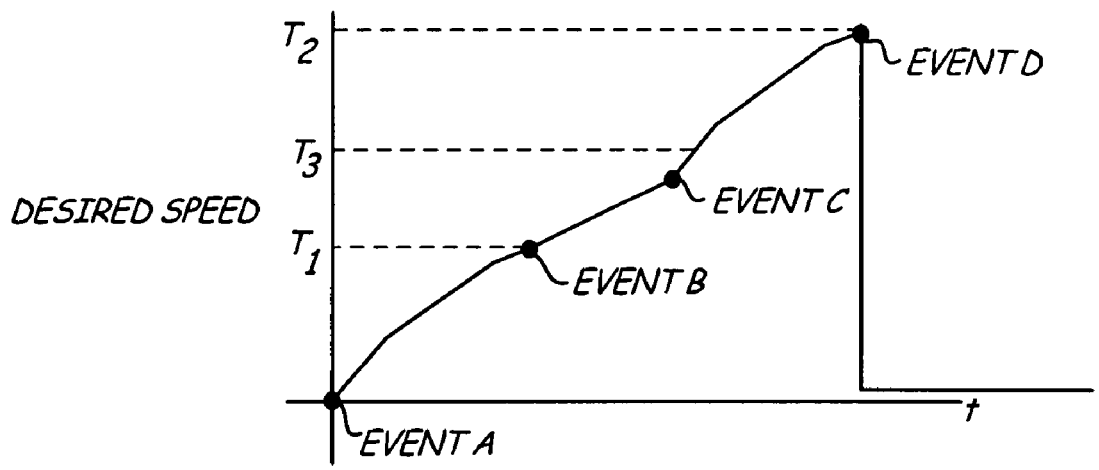
FIGS. 2A-2B are charts illustrating the control of gas turbine engine speed by the starter controller.
Figure 2B:
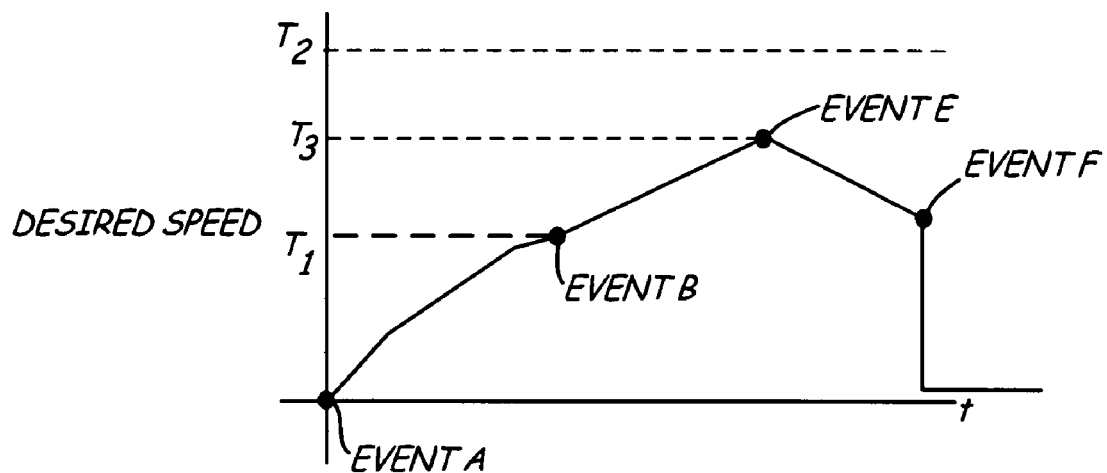

FIGS. 2A-2B illustrate the desired speed selected by starter controller 10 based on detected events. The torque command provided to starter system 12, as shown in FIG. 1, is based on the desired speed selected by starter controller 10. The first event detected by starter controller 10 is a start request (event A in FIGS. 2A-2B). The start request received by starter controller 10 indicates a desire to start gas turbine engine 14. For instance, the start request may be provided by a pilot to initiate the start of gas turbine engine 14. Upon detection of the start request event, starter controller 10 initiates a first phase in which starter controller 10 causes gas turbine engine 14 to increase in speed towards a first threshold value (labeled 'T1' in FIGS. 2A-2B). In this first phase, the speed of gas turbine engine 14 may be increased rapidly (as shown in FIGS. 2A-2B) toward the first threshold.

Engine speed is monitored by starter controller 10 to determine when gas turbine engine 14 reaches the first threshold (event B). Upon detection of this event, starter controller 10 causes the speed of gas turbine engine to ramp (increase) at a defined rate (slope) through a range of speeds suitable for light-off (i.e., a light-off window). The fuel/air mixture that is provided to the combustion chamber of gas turbine engine 14 is dependent on the speed of gas turbine engine 14. Therefore, causing the speed of gas turbine engine to increase at a defined rate (i.e., ramping) results in a variety of fuel/air mixtures being provided to the combustion chamber. This improves the likelihood of generating a fuel/air mixture that is conducive to light-off.

As starter controller 10 causes gas turbine engine 14 to ramp through the light-off window, conditions within gas turbine engine 14 are monitored to detect a successful light-off. This may include monitoring temperature or light emissions within gas turbine engine 14, and is represented by the engine sequence input provided as an input to starter controller 10. If light-off of gas turbine 14 is detected by starter controller 10 (event C in FIG. 2A), then starter controller 10 causes the speed of gas turbine engine to increase towards a second threshold value (T2). Once again, engine speed is monitored by starter controller 10 to determine when gas turbine engine 14 reaches the second threshold (event D), at which point gas turbine engine 14 is self-sustainable and starter controller 10 cuts-off the supply of motive power to gas turbine engine 14.

In contrast, FIG. 2B illustrates operation of starter controller 10 if no light-off is detected. Starter controller 10 begins operation in the same manner shown in FIG. 2A. However, if gas turbine engine 14 ramps through the entire light-off window without a light-off event being detected (event E in FIG. 2B), then starter controller 10 causes the speed of gas turbine engine to decrease at a defined rate back through the light-off window. For example, if the speed of gas turbine engine 14 reaches a speed defined by a third threshold value (T3) then starter controller 10 causes engine speed to decrease in speed at a defined rate through the light-off window. The decreasing speed of gas turbine engine 14 results in a varying fuel/air mixture being provided to the combustion chamber, and provides another opportunity for gas turbine engine 14 to achieve light-off. If the speed of gas turbine engine 14 is decreased through the light-off window without starter controller 10 detecting a light-off (event F), then starter controller 10 causes the start operation to be aborted, and the speed of gas turbine engine 14 is reduced to zero.

Figure 3:
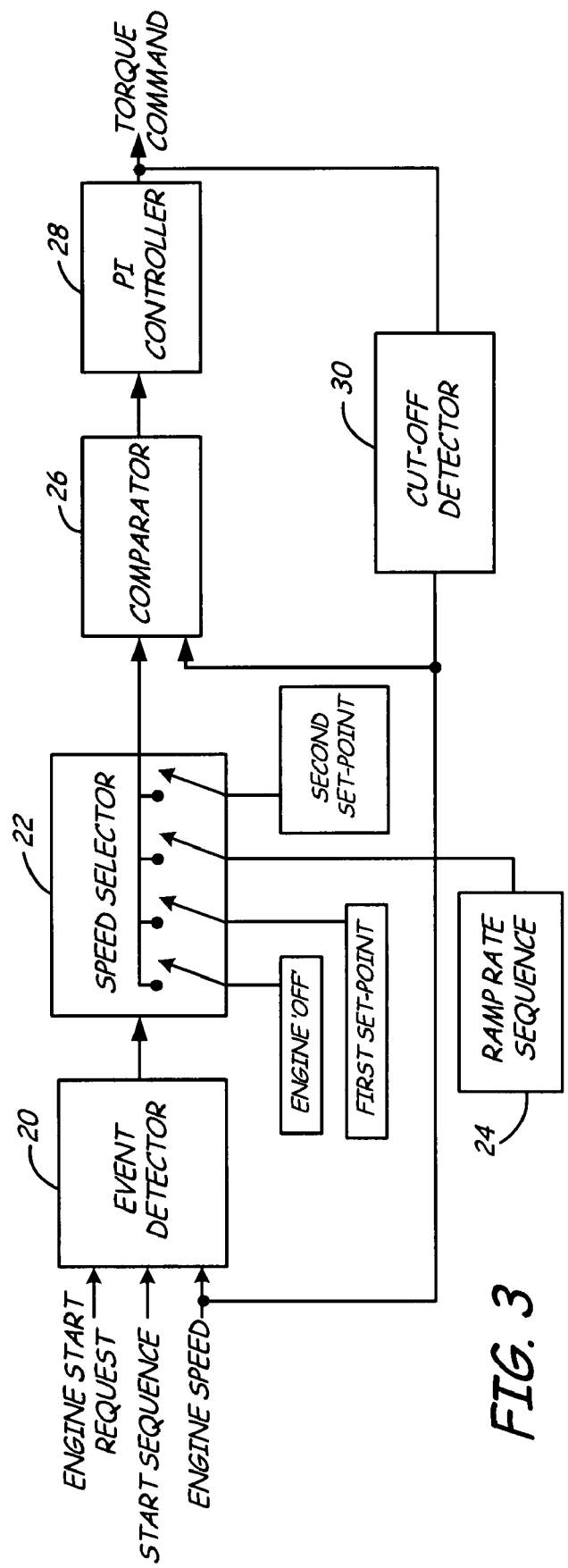
FIG. 3 is a block diagram of control operation performed by the starter controller to control the speed of the gas turbine engine.

FIG. 3 is a block diagram illustration of control operations performed within starter controller 10 to provide event-driven starter control. Control operations performed by even-driven starter controller includes event detector 20, speed selector switch 22, ramp-rate sequencer 24, comparator 26, proportional-integral (PI) controller 28, and engine cut-off 30.

Event detector 20 receives three inputs, including Engine Start Request, Start Sequence, and Engine Speed. Based on these inputs, sequence detector detects events associated with the start of gas turbine engine 14. Based on these detected events, event detector 20 provides an output to selector switch 22 to select between one of four inputs provided to speed selector switch 22. The input selected by speed selector switch 22 represents a desired speed of gas turbine engine 14. The selected speed is provided to comparator 26, which compares the desired speed selected by speed selector switch 22 to a measured speed of gas turbine engine 14. Based on the result of the comparison, PI controller 28 generates a torque command that increases or decreases the speed of gas turbine engine 14 such that the engine speed is increased or decreased as necessary to achieve the desired speed selected by speed selector switch 22.

If event detector 20 generates an output relating to an engine 'off' state (i.e., prior to receiving an engine start request), then speed selector switch 22 is controlled to select the first input (Engine Off). This results in a desired speed of zero being provided to comparator 26. In response, PI controller 28 generates torque such that the speed of gas turbine engine 14 is maintained at zero.

If an Engine Start Request is received by event detector 20, then event detector 20 generates an output that causes speed selector switch 22 to select the second input (First Set-Point). The First Set-Point represents a desired engine speed. Speed selector switch 22 provides the first set-point to comparator 26, which compares the desired speed defined by the First Set-Point to the measured engine speed and provides the difference to PI controller 28. In response, PI controller 28 generates a torque command that causes the engine speed to increase rapidly toward the First Set-Point. In one embodiment, the engine speed associated with the First Set-Point is greater than the first threshold value discussed with respect to FIGS. 2A and 2B. That is, engine speed is increased toward the First Set-Point, but before reaching the First Set-Point, engine speed reaches the first threshold (as shown in FIGS. 2A-2B) and transitions to a ramping sequence through the light-off window.

In response to the engine speed reaching the first threshold value (as shown in FIGS. 2A-2B), event detector 20 causes speed selector switch 22 to select the third input, which is provided by ramp rate sequencer 24. Ramp rate sequencer 24 generates a desired engine speed that increases at a defined rate. Once again, the desired engine speed generated by ramp rate sequence 24 is provided to comparator 26 and PI controller 28 to generate a torque command that results in the engine speed of gas turbine engine 14 increasing at a defined ramp rate. Upon reaching the third threshold value (T3) of a light-off window (as shown by event E in FIG. 2B), ramp rate sequencer 24 will generate a desired engine speed value that decreases at a defined rate.

If light-off is detected by event detector 20 based on the Start Sequence input, then event detector 20 causes speed control selector to select the fourth and final input (Second Set-Point). The Second Set-Point provides a desired engine speed. In this case, the Second Set-Point causes gas turbine engine to increase rapidly towards an operational speed of gas turbine engine 14, or a speed at which gas turbine engine 14 is self-sustainable. The second set-point is provided to comparator 26, which compares the desired speed to the current measured engine speed and provides the difference to PI controller 28. In response, PI controller generates a torque command that causes the engine speed to increase rapidly towards the desired value.

Finally, starter controller 10 includes cut-off switch 30. In response to the monitored engine speed reaching the second threshold value (as shown in FIG. 2A), cut-off switch 30 generates a signal that prevents starter system 12 from providing motive force to gas turbine engine 14. That is, cut-off switch 30 generates a signal that switches the output provided to starter system 12 from the output of PI controller 28 to a zero value, resulting in a torque value of zero being provided to starter system 12.

Figure 4:
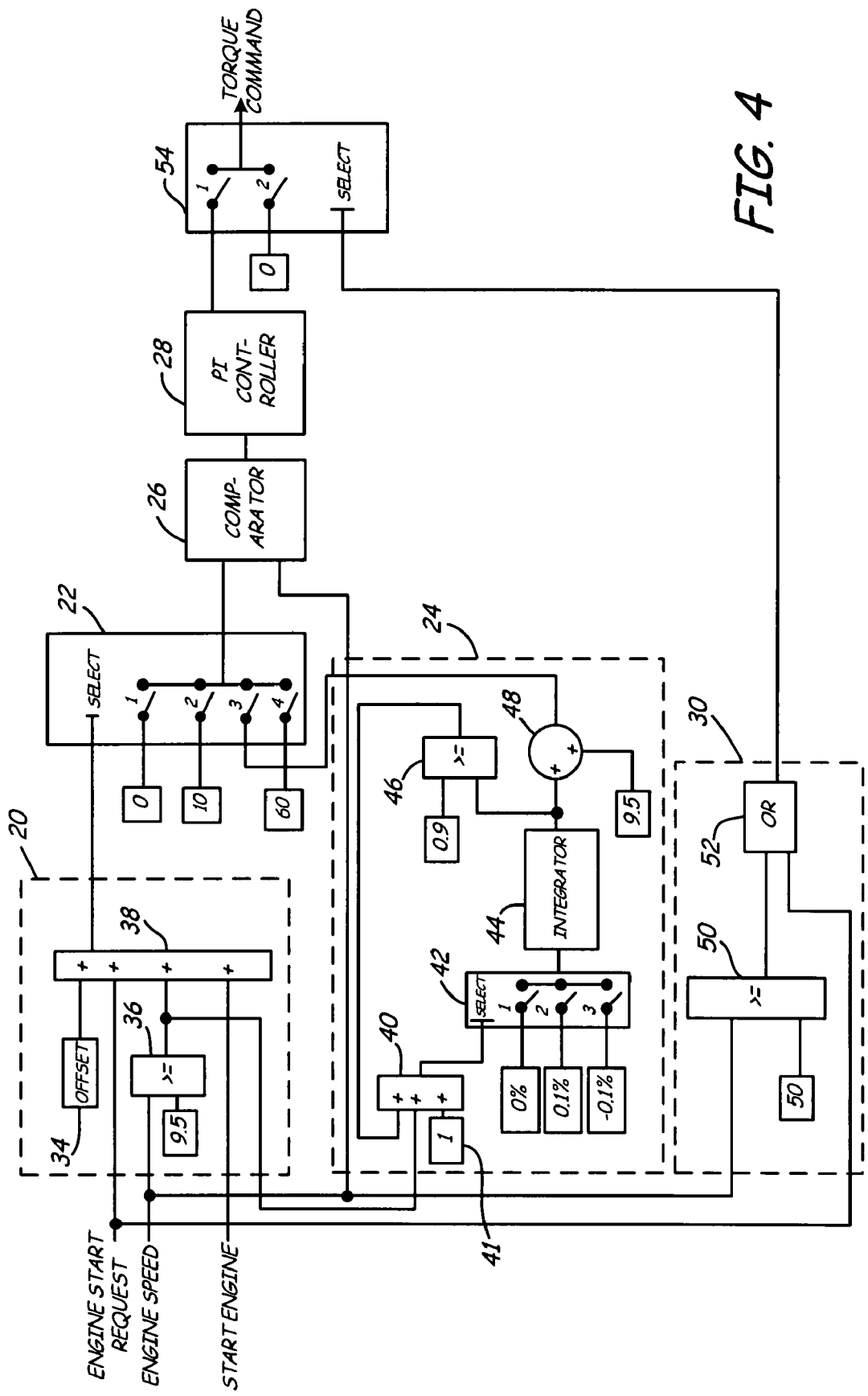
FIG. 4 is a block diagram illustrating one embodiment of an implementation of the control operation shown in FIG. 3.

FIG. 4 is a control flowchart that illustrates one embodiment of event-driven starter controller 10 as shown in FIG. 3. The example shown in FIG. 4 provides actual examples of values that may be employed, although the present invention is not limited to the values used in this example. FIG. 4 is divided into the components shown in FIG. 3, including event detector 20, speed selector switch 22, ramp rate sequencer 24, comparator 26, PI controller 28, and cut-off detector 30. Event detector 20 includes offset 34, greater-than-or-equal-to comparator 36, and summer 38. Ramp rate sequencer includes offset 39, summer 40, selector switch 42, integrator 44, greater-than-or-equal-to comparator 46, and summer 48. Cut-off switch 30 includes greater-than-or-equal-to comparator 50 and a logical OR operator 52.

Event detector provides an output corresponding to a numerical value of one through four to speed selection switch 22. The output is generated based on detected events that result in non-zero inputs being provided to summer 38. For each non-zero input provided to summer 34, the output of summer is increased to notify speed selection switch 22 of the detected event. For instance, offset 34 is typically a constant value (e.g., one). Therefore, prior to the detection of any events, only offset 34 provides a non-zero value to summer 38. In response, summer 38 provides a value of one to speed selector switch 22, thereby causing speed selector switch 22 to select the first input. In this embodiment, the first input is a constant value of zero, which results in speed selector switch 22 providing a value of zero to comparator 26. Based on the speed selected by speed selection switch 22, comparator 26 and PI controller 28 act to control the speed of gas turbine engine 14 to equal zero.

Upon receiving an engine start request, an additional non-zero input is provided to summer 38, which is added to offset 34 to generate an output corresponding to a numerical value of two. In response, speed selection switch 22 is controlled to select the second input, which represents a first speed set-point. In this embodiment, the first speed set-point is set to a constant value of '10' that represents an engine speed that is ten percent of the normal operating speed of gas turbine engine 14. Based on the selection of the First Set-Point, comparator 26 and PI controller 28 act to increase the speed of gas turbine engine 14 to a speed of '10'. For the sake of simplicity, engine speeds will be referred to as constant values that correspond to a percentage of operational engine speeds.

Event detector 20 monitors the engine speed as gas turbine engine is increased toward '10'. Greater-than-or-equal-to comparator 36 compares the monitored engine speed to a first threshold (constant value '9.5'). When the monitored engine speed exceeds '9.5', an additional non-zero input is provided to summer 38. Thus, when the engine speed reaches the first threshold, an event is detected and the output of summer 38 is changed to a numerical value of three. This results in speed selector switch 22 selecting the third input, which is provided by ramp rate sequencer 24.

Ramp rate sequencer 24 receives input from event detector 20 indicating when engine speed has reached the first threshold (i.e., engine speed >='9.5'). The input from event detector 20 is provided to summer 40, which detects events within the light-off window and in response provides a numerical output to selector switch 42. Based on events detected by summer 40, selector switch 42 selects from one of the three inputs to which it is connected.

Before the first threshold is reached, summer 40 only receives non-zero input from offset value 41 (corresponding to a value of one), thereby resulting in the selection of the first input of selector switch 42. In this embodiment, the first input provided to selector switch 42 is a constant value of zero. Providing the zero value to integrator 44 results in integrator 44 generating a zero-value. This results in a value of '9.5' being provided to the third input of speed selection switch 22. However, at this point, prior to engine speed reaching the first threshold value (in this example, 9.5), speed selector switch 22 is controlled to select the second input, rather than the third input provided by ramp rate sequencer 24. Thus, at this stage, ramp rate sequencer operates in a holding pattern that maintains the output of integrator 44 at a constant value of zero.

Upon reaching the first threshold, the input to summer 40 results in a numerical value of two being provided to selector switch 42. In response, selector switch 42 selects the second input, which corresponds to a value of '0.1'. This value represents the rate at which engine speed should be increased through the light-off window. Integrator 44 uses the constant value of 0.1 provided by selector switch 42 to generate a value that increases in time at a rate of 0.1 percent of operational speed/per second. Summer 48 adds the value provided by integrator 44 to a constant value of '9.5' to generate a speed command that increases from a constant value of '9.5' at a rate defined by integrator 44. The result is provided to the third input of speed selector switch 22. As a result, speed selector switch 22 provides an increasing value to comparator 26 and PI controller 28 that causes engine speed to be increased at a defined rate through the light-off window.

The output generated by adder 48 continues to increase until the output of integrator 44 exceeds the value to which it is compared by greater-than-or-equal-to operator 46. In this case, when the output of integrator 44 exceeds 0.9, which corresponds to the desired engine speed provided to the third input of speed selector switch 22 reaching a value of 10.4, then greater-than-or-equal-to comparator 46 provides non-zero feedback to adder 40 that results in a numerical value of three being provided to switch selector 42. In this example, 10.4 would represent the third threshold value T3 as shown in FIGS. 2A-2B. In response, switch selector 42 selects the third input, which is a constant value representing the negative ramp rate at which engine speed should be decreased through the light-off window. In this example the negative ramp rate is '-0.1'. Integrator 44 uses the constant value of '-0.1' provided by selector switch 42 to generate a value that decreases in time at a rate of 0.1 percent of operational speed/per second. The result of integrator 44 is added to constant value 9.5 by summer 48. The decreasing value generated by summer 48 is provided to the third input of speed selector switch 22. As a result, speed selector switch 22 provides a decreasing value to comparator 26 and PI controller 28 that causes engine speed to be decreased at a defined rate through the light-off window.

Event detector 20 continues to monitor engine conditions during the ramping sequence provided by ramp-rate sequencer 24. If at any time during the ramping sequence, event detector 20 detects a successful light-off of gas turbine engine 14, then an additional non-zero input (i.e., Engine Sequence input) is provided to summer 38. In response, summer 38 generates a numerical value of four that is provided to speed selector switch 22, resulting in speed selector switch 22 selecting the fourth input. In this case, the fourth input is a Second Speed Set-Point that has been assigned a constant value of sixty. In response, comparator 26 and PI controller 28 cause the speed of gas turbine engine 14 to increase toward the Second Set-Point.

During this time, cut-off detector 30 monitors the speed of gas turbine engine 14. Greater-than-or-equal-to comparator 50 compares the engine speed to a second threshold value, which in this embodiment is a constant value of fifty. As engine speed reaches and exceeds the second threshold value, a non-zero input is provided by greater-than-or-equal-to comparator 50 to the OR operator 52. Upon initially receiving the Start Request, OR operator causes torque switch 54 to select a first input that corresponds to the output provided by PI controller 28. Upon detection of engine speed exceeding the second threshold value (as indicated by the output of greater-than-or-equal-to comparator 50), OR operator 52 causes torque switch 52 to select a second input. In this embodiment, the second input is a zero value that causes the torque command provided to motor starter 12 to be decreased to zero. That is, once gas turbine engine 14 reaches a self-sustainable speed as determined by the second threshold value, the motive force provided by starter motor 12 is no longer necessary.

Although the present invention has been described with reference to preferred embodiments, workers skilled in the art will recognize that changes may be made in form and detail without departing from the spirit and scope of the invention. In particular, the control operations performed by starter controller 10 may be implemented in either hardware or software, or a combination of both.

The invention claimed is:

1. A starter controller that controls the speed of a gas turbine engine during start-up, the starter controller comprising:
    an event detector that detects events associated with the start-up of the gas turbine engine based on inputs that include an engine start request, an engine speed measurement, and a light-off detection measurement; and
    a torque controller that generates a torque command that causes the speed of the gas turbine engine to increase at a defined rate until the event detector detects a light-off event and causes the speed of the gas turbine engine to increase at an increased rate following detection of the light-off event, wherein if the measured speed of the gas turbine engine increases to a upper threshold without the event detector detecting a light-off event, then the torque controller generates a torque command that causes the speed of the gas turbine engine to decrease at a defined rate until the event detector detects a light-off event or the measured speed of the gas turbine engine reaches a lower threshold.

2. The starter controller of claim 1, wherein the torque controller includes:
    a speed selector switch that is controlled based on events detected by the event detector to select from one of a number of speed inputs including an engine off speed, a first set-point, a ramping input, and a second set-point, wherein the speed inputs are used by the torque controller to control the speed of the gas turbine engine.

3. The starter controller of claim 2, wherein the torque controller includes:
    a comparator for comparing the speed input provided by the speed selector switch to the measured engine speed; and
    a proportional-integral (PI) controller that generates the torque command that controls the speed of the gas turbine engine, wherein the torque command is based on the comparison between the speed input and the measured engine speed.

4. The starter controller of claim 3, wherein the torque controller includes:
    a ramp rate sequencer that generates the ramping input that is provided to the speed selector switch, wherein the ramp rate sequencer causes the ramping input to increase in magnitude at a defined rate until the engine speed reaches the upper threshold, wherein upon reaching the upper threshold the ramp rate sequencer causes the ramping input to decrease in magnitude at a defined rate.

5. The starter controller of claim 1, wherein the torque controller includes:
    a cut-off detector that prevents torque from being provided to the gas turbine engine in response to the engine speed reaching a third threshold value following detection of a successful light-off event.

6. The starter controller of claim 2, wherein the event detector includes:
    means for detecting events and generating a numerical value representing the detected events, wherein the numerical value of means for detecting events is provided to the speed selector switch to select between the number of speed inputs.

7. A method of controlling speed of a gas turbine engine during start-up by providing motive force to the gas turbine engine, the method comprising:
    controlling the speed of the gas turbine engine to increase toward a first speed set-point in response to a detected engine start request;
    controlling the speed of the gas turbine engine to increase at a defined rate in response to the engine speed reaching a first threshold value;
    controlling the speed of the gas turbine engine to increase towards a second set-point in response to a detected successful light-off event; and
    controlling the speed of the gas turbine engine to decrease at a defined rate in response to the engine speed being increased at the define rate to an upper threshold value without achieving light-off.

8. The method of claim 7, further including:
    controlling the motive power provided to the gas turbine engine to be reduced to zero in response to the engine speed of the gas turbine engine reaching a second threshold value that indicates the gas turbine engine is self-sustaining.

9. The method of claim 7, further including:
    controlling the motive power provided to the gas turbine engine to be reduced to zero in response to the engine speed being decreased at the define rate to a lower threshold value without achieving light-off.

10. The method of claim 7, wherein the upper threshold and lower threshold define a range of engine speeds known to be conducive to light-off of the gas turbine engine.

11. The method of claim 7, wherein controlling the speed of the gas turbine engine to increase toward the first speed set-point includes:

comparing the first-speed set-point to a measured value of the engine speed; and generating a torque command that is provided to a starter motor based on the comparison between the first speed set-point and the measured engine speed.

12. The method of claim 7, wherein the first speed-set point is greater than the first threshold, such that the gas turbine engine is controlled to increase at the defined rate prior to the gas turbine engine reaching the first speed set-point.

13. An event-driven starter controller for providing motive force to a gas turbine engine during start-up, the starter controller comprising:

means for detecting events associated with the start-up of the gas turbine engine based on inputs that include a start engine request, a measured engine speed, and a successful light-off;

means for controlling the speed of the gas turbine engine to increase toward a first speed set-point in response to detection of a start engine request;

means for controlling the speed of the gas turbine engine to increase at a first defined rate in response to detection of the engine speed reaching a first threshold value;

means for controlling the speed of the gas turbine engine to increase towards a second set-point in response to a detected successful light-off of the gas turbine engine; and means for controlling the speed of the gas turbine engine to decrease at a second defined rate in response to detection of the engine speed being increased at the defined rate to an upper threshold value without achieving light-off.

14. The event-driven starter controller of claim 13, further including:

means for removing the supply of motive force to the gas turbine engine in response to the engine speed reaching a second threshold value following detection of a successful light-off of the gas turbine engine.

15. The event-driven starter controller of claim 13, wherein the means for controlling the speed of the gas turbine engine includes:

a speed selector switch that is controlled based on events detected by the means for detecting events to select from one of a number of speed inputs including an engine off speed, a first set-point, a ramping input, and a second set-point, wherein the speed inputs are used by the torque controller to control the speed of the gas turbine engine.

a comparator for comparing the speed input provided by the speed selector switch to the measured engine speed; and a proportional-integral (PI) controller that generates the torque command that controls the speed of the gas turbine engine, wherein the torque command is based on the comparison between the speed input and the measured engine speed.

16. The event-driven starter controller of claim 15, wherein the means for controlling the speed of the gas turbine engine to increase at a first defined rate includes:

a ramp rate sequencer that generates the ramping input that is provided to the speed selector switch, wherein the ramp rate sequencer causes the ramping input to increase in magnitude at a defined rate until the engine speed reaches the upper threshold, wherein upon reaching the upper threshold the ramp rate sequencer causes the ramping input to decrease in magnitude at a defined rate.

* * * * *